(12) United States Patent
Clemm et al.

(10) Patent No.: US 10,841,283 B2
(45) Date of Patent: Nov. 17, 2020

(54) SMART SENDER ANONYMIZATION IN IDENTITY ENABLED NETWORKS

(71) Applicant: Futurewei Technologies, Inc., Plano, TX (US)

(72) Inventors: Alexander Clemm, Los Gatos, CA (US); Uma S. Chunduri, Fremont, CA (US); Padmadevi Pillay-Esnault, Santa Clara, CA (US); Yingzhen Qu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 191 days.

(21) Appl. No.: 15/833,185

(22) Filed: Dec. 6, 2017

(65) Prior Publication Data

US 2019/0020628 A1    Jan. 17, 2019

Related U.S. Application Data

(60) Provisional application No. 62/533,505, filed on Jul. 17, 2017.

(51) Int. Cl.
*H04L 29/06* (2006.01)
*H04L 29/12* (2006.01)
(Continued)

(52) U.S. Cl.
CPC ........ *H04L 63/0421* (2013.01); *G06F 16/955* (2019.01); *H04L 61/103* (2013.01);
(Continued)

(58) Field of Classification Search
CPC ............. H04L 63/0421; H04L 61/2539; H04L 63/126; H04L 61/103; H04L 61/2084; G06F 16/955; H04W 12/02
See application file for complete search history.

(56) References Cited

U.S. PATENT DOCUMENTS 8,966,075 B1    2/2015  Chickering et al.
10,051,075 B1*  8/2018  Kothari ................. H04L 67/141
(Continued)

FOREIGN PATENT DOCUMENTS

CN    102045314 A    5/2011
CN    102075937 A    5/2011
(Continued)

OTHER PUBLICATIONS

Pillay-Esnault, Ed., et al., "Problem Statement for Identity Enabled Networks," draft-padma-ideas-problem-statement-01, Mar. 12, 2017, 15 pages.
(Continued)

*Primary Examiner* — Ghodrat Jamshidi
(74) *Attorney, Agent, or Firm* — Conley Rose, P.C.

(57) ABSTRACT

A method implemented by a sending host entity comprises sending, by the sending host entity, a data packet to a receiving host entity, a source identifier field of the data packet comprising an anonymized identifier of the sending host entity, the anonymized identifier being a temporary identifier of the sending host entity, and sending, by the sending host entity to a distributed mapping system, a request for the distributed mapping system to send information identifying the sending host entity to the receiving host entity.

23 Claims, 8 Drawing Sheets

(51) Int. Cl.
*G06F 16/955* (2019.01)
*H04W 12/02* (2009.01)

(52) U.S. Cl.
CPC ...... *H04L 61/2084* (2013.01); *H04L 61/2539* (2013.01); *H04L 63/126* (2013.01); *H04W 12/02* (2013.01)

(56) References Cited

U.S. PATENT DOCUMENTS

| | | | | |
|---|---|---|---|---|
| 2011/0035585 | A1* | 2/2011 | Haddad | H04L 63/0414 713/162 |
| 2012/0203856 | A1* | 8/2012 | Wu | H04L 63/0407 709/206 |
| 2012/0320815 | A1 | 12/2012 | Massena | |
| 2013/0005368 | A1* | 1/2013 | Hunziker | H04W 12/10 455/466 |
| 2013/0124630 | A1 | 5/2013 | Reunamaki et al. | |
| 2014/0162601 | A1 | 6/2014 | Kim et al. | |
| 2014/0258421 | A1* | 9/2014 | Langhorst | H04L 51/28 709/206 |
| 2014/0281491 | A1* | 9/2014 | Zaverucha | H04L 9/321 713/155 |
| 2015/0024782 | A1 | 1/2015 | Edge | |
| 2015/0124826 | A1* | 5/2015 | Edsall | H04L 12/4633 370/392 |
| 2016/0182497 | A1 | 6/2016 | Smith | |
| 2017/0054692 | A1 | 2/2017 | Weis | |
| 2017/0099658 | A1* | 4/2017 | Shattil | H04B 7/024 |
| 2017/0153980 | A1* | 6/2017 | Ara jo | H04L 61/6059 |
| 2017/0237710 | A1* | 8/2017 | Mayya | H04L 45/64 726/13 |
| 2017/0244676 | A1* | 8/2017 | Edwards | G06F 21/35 |
| 2017/0302641 | A1* | 10/2017 | Ramatchandirane | H04L 63/0421 |
| 2017/0308717 | A1* | 10/2017 | Huang | G16B 50/30 |
| 2017/0316106 | A1 | 11/2017 | Pillay-Esnault | |
| 2018/0027416 | A1* | 1/2018 | Bickford | H04W 12/1208 726/23 |
| 2018/0139133 | A1 | 5/2018 | Makhijani et al. | |
| 2018/0227301 | A1 | 8/2018 | Maruyama et al. | |
| 2018/0253738 | A1 | 9/2018 | Benson | |
| 2018/0352428 | A1* | 12/2018 | Sobieski | G06F 21/6254 |

FOREIGN PATENT DOCUMENTS

| | | |
|---|---|---|
| CN | 104823471 A | 8/2015 |
| EP | 1492306 A2 | 12/2004 |

OTHER PUBLICATIONS

Pillay-Esnault, Ed., et al., "Requirements for Generic Resilient Identity Services in Identity Enabled Networks," draft-padma-ideas-req-grids-00, Mar. 13, 2017, 15 pages.
Farinacci, et al., "Teh Locator/ID Separation Protocol (LISP)," RFC 6830, Jan. 2013, 75 pages.
Moskowitz, Ed., et al., "Host Identity Protocol Version 2 (HIPv2)," RFC 7401, Apr. 2015, 128 pages.
Farinacci, D., et al., "LISP EID Anonymity," draft-farinacci-lisp-eid-anonymity-02, Apr. 12, 2017, 9 pages.
Chunduri, U., et al., U.S. Appl. No. 15/833,180, Title: "Receiver Directed Anonymization of Identifier Flows in Identity Enabled Networks," filed Dec. 6, 2017.
Chunduri, et al., "Identity Use Cases in IDEAS," draft-ccm-ideas-identity-use-cases-01, Jul. 3, 2017, 10 pages.
Postel, "DARPA Internet Program Protocol Specification," Information Sciences Institute, RFC 791, Sep. 1981, 50 pages.
Farinacci, D., et al., "LISP EID Anonymity," XP015112981, draft-farinacci-lisp-eid-anonymity-00, May 6, 2016, 8 pages.
Rui, T., et al., "Network Access Control Mechanism based on Locator/Identifier Split," XP031505400, IEEE International Conference on Networking, Architecture, and Storage, 2009, pp. 171-174.
Yan, Z., et al., "A Novel Mobility Management Mechanism Based on an Efficient Locator/ID Separation Scheme," XP031570381, First International Conference on Future Information Networks, 2009, 6 pages.
Orava, P., et al., "Temporary MAC Addresses for Anonymity," XP040383750, IEEE P802.11, Wireless LANs, Jun. 2002, 17 pages.
Farinacci, et al., "LISP EID Anonymity," draft-farinacci-lisp-eid-anonymity-01, Oct. 31, 2016, 8 pages.
Herbert, T., et al., "Identifier-locator addressing for IPv6," draft-herbert-nvo3-ila-04, Mar. 13, 2017, 39 pages.
Kompella, K., et al., "Link Bundling in MPLS Traffic Engineering (TE)," RFC 4201, Oct. 2005, 12 pages.
Raza, K., et al., "Controlling State Advertisements of Non-negotiated LDP Applications," RFC 7473, Mar. 2015, 15 pages.
Machine Translation and Abstract of Chinese Publication No. CN102075937, May 25, 2011, 11 pages.
Foreign Communication From a Counterpart Application, PCT Application No. PCT/CN2017/081216, International Search Report dated Jun. 30, 2017, 4 pages.
Foreign Communication From a Counterpart Application, European Application No. 17788703.1, Extended European Search Report dated Feb. 22, 2019, 9 pages.
Office Action dated May 25, 2018, 19 pages, U.S. Appl. No. 15/491,828 filed Apr. 19, 2017.
Office Action dated Mar. 21, 2019, 20 pages, U.S. Appl. No. 15/924,919 filed Mar. 19, 2018.

* cited by examiner

300

| Identity of Sending Host Entity 306 | Metadata 316 | U-ID 321 | Locators 323 | Anonymized IDs 326 |
|---|---|---|---|---|
| Identity of Receiving Host Entity 330 | Metadata 333 | U-ID 336 | Locators 339 | Anonymized IDs 341 |

SMART SENDER ANONYMIZATION IN IDENTITY ENABLED NETWORKS

CROSS-REFERENCE TO RELATED APPLICATIONS

The present application claims benefit of U.S. Provisional Patent Application No. 62/533,505 filed Jul. 17, 2017 by Alexander Clemm, et al. and entitled "Smart Sender Anonymization in Identity-Oriented Networks," which is incorporated herein by reference as if reproduced in its entirety.

BACKGROUND

Currently, the Internet widely uses Internet Protocol (IP) addresses to identify locations of a host entity, such as a user equipment (UE). An IP address is a numerical label assigned to each host entity participating in a computer network that uses the IP for communication. An IP address serves two principal functions: host or network interface identification and location addressing. Two versions of the IP are in use: IP Version 4 (IPv4) and IP Version 6 (IPv6). Host entities may also be addressed using an identifier that is unique to the host entity. Identifier Enabled Networks (IENs) disassociate an identifier and a location from a host entity such that established communications are not interrupted when a host entity changes location. The identifier and the location of the host entity are publicly known so that other entities may communicate with the host entity. The public availability of the identifier and location of the host entity make it difficult to anonymize the host entity.

SUMMARY

In accordance with an example embodiment, a method implemented by a sending host entity is provided. The method includes sending, by the sending host entity, a data packet to a receiving host entity, a source identifier field of the data packet comprising an anonymized identifier of the sending host entity, the anonymized identifier being a temporary identifier of the sending host entity, and sending, by the sending host entity to a distributed mapping system, a request for the distributed mapping system to send information identifying the sending host entity to the receiving host entity.

Optionally, in any of the preceding embodiments, the data packet is sent to the receiving host entity via a sending endpoint network device (END) and a receiving END, wherein the sending END and the receiving END are routers.

Optionally, in any of the preceding embodiments, the information identifying the sending host entity comprises metadata, and wherein the metadata indicates a type of device of the sending host entity.

Optionally, in any of the preceding embodiments, the information identifying the sending host entity comprises metadata, wherein the metadata indicates a classification of the sending host entity, and wherein the classification indicates whether the sending host entity is trustworthy.

Optionally, in any of the preceding embodiments, the information identifying the sending host entity comprises a token, wherein the token is received from the receiving host entity prior to sending the data packet to the receiving host entity.

Optionally, in any of the preceding embodiments, the information identifying the sending host entity comprises a user identifier (U-ID) of the sending host entity, and wherein the U-ID is a known identifier that uniquely identifies the sending host entity.

Optionally, in any of the preceding embodiments, the sending host entity uses a user identifier (U-ID) for communications with a second receiving host entity, wherein the U-ID is a known ID that uniquely identifies the receiving host entity.

In an accordance with an example embodiment, a network element implemented as a sending host entity is provided. The network element includes a memory storage comprising instructions, and one or more processor in communication with the memory storage, wherein the one or more processors execute the instructions to send a data packet to a receiving host entity, a source identifier field of the data packet comprising an anonymized identifier of the sending host entity, the anonymized identifier being a temporary identifier of the sending host entity, and send, to a distributed mapping system, a request for the distributed mapping system to send information identifying the sending host entity to the receiving host entity.

In accordance with an example embodiment, a method implemented by a receiving END acting on behalf of a receiving host entity is provided. The method includes receiving information identifying a sending host entity, receiving a data packet from a sending END associated with the sending host entity, a source identifier field of the data packet comprising an anonymized identifier of the sending host entity, the anonymized identifier being a temporary identifier of the sending host entity, and determining whether the anonymized identifier matches the information identifying the sending host entity.

Optionally, in any of the preceding embodiments, the method further includes transmitting, by the receiving END, the data packet to the receiving host entity when the anonymized identifier matches the information identifying the sending host entity.

Optionally, in any of the preceding embodiments, the information identifying the sending host entity comprises metadata, and wherein the metadata indicates a type of device of the sending host entity.

Optionally, in any of the preceding embodiments, the information identifying the sending host entity comprises metadata, wherein the metadata indicates a classification of the sending host entity, and wherein the classification indicates whether the sending host entity is trustworthy.

Optionally, in any of the preceding embodiments, the information identifying the sending host entity comprises a token, wherein the token is sent to the sending host entity prior to sending the data packet to the receiving host entity.

Optionally, in any of the preceding embodiments, the information identifying the sending host entity comprises a user identifier (U-ID) of the sending host entity, and wherein the U-ID is a known identifier that uniquely identifies the sending host entity.

In an accordance with an example embodiment, a network element implemented as a receiving endpoint network device (END) acting on behalf of a receiving host entity is provided. The network element includes a memory storage comprising instructions, and one or more processor in communication with the memory storage, wherein the one or more processors execute the instructions to receive information identifying a sending host entity, receive a data packet from a sending END associated with the sending host entity, a source identifier field of the data packet comprising an anonymized identifier of the sending host entity, the anonymized identifier being a temporary identifier of the sending host entity, and determine whether the anonymized identifier matches the information identifying the sending host entity.

In accordance with an example embodiment, a method implemented by a distributed mapping system is provided. The method includes maintaining metadata associated with a sending host entity, a U-ID of a receiving host entity, and a locator of the receiving host entity, the metadata including information identifying and describing the sending host entity, the U-ID being a fixed identifier that uniquely identifies the receiving host entity, receiving, from the sending host entity, a request to send the metadata of the sending host entity to the receiving host entity, and sending the metadata to the receiving host entity.

Optionally, in any of the preceding embodiments, the request is received from the sending host entity via a sending END, wherein the sending END is a router.

Optionally, in any of the preceding embodiments, the metadata indicates a type of device of the sending host entity.

Optionally, in any of the preceding embodiments, the method further comprises storing the anonymized identifier in association with the receiving host entity.

Optionally, in any of the preceding embodiments, the metadata indicates a classification of the sending host entity, and wherein the classification indications whether the sending host entity is trustworthy.

Optionally, in any of the preceding embodiments, the metadata comprises a token that the sending host entity received from the receiving host entity.

Optionally, in any of the preceding embodiments, a plurality of locators are stored in associated with the U-ID of the receiving host entity.

In an accordance with an example embodiment, a network element implemented as a distributed mapping system is provided. The network element includes a memory storage comprising instructions, and one or more processor in communication with the memory storage, wherein the one or more processors execute the instructions to maintain metadata associated with a sending host entity, a user identifier (U-ID) of a receiving host entity, and a locator of the receiving host entity, the metadata including information identifying and describing the sending host entity, the U-ID being a fixed identifier that uniquely identifies the receiving host entity, receive, from the sending host entity, a request to send the metadata of the sending host entity to the receiving host entity, and send the metadata to the receiving host entity.

The embodiments disclosed herein enable a sending host entity to customize anonymization to specific receiving host entities and to outside observers. For example, a sending host entity may use different anonymized identifiers for different receiving host entities such that the sending host entity may differentiate how to be anonymized to various receiving host entities. The embodiments disclosed herein also enable a receiving host entity to choose to accept anonymous communications from sending host entities based on metadata related to the sending host entities, thereby mitigating the risk of accepting traffic from unknown sending host entities.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
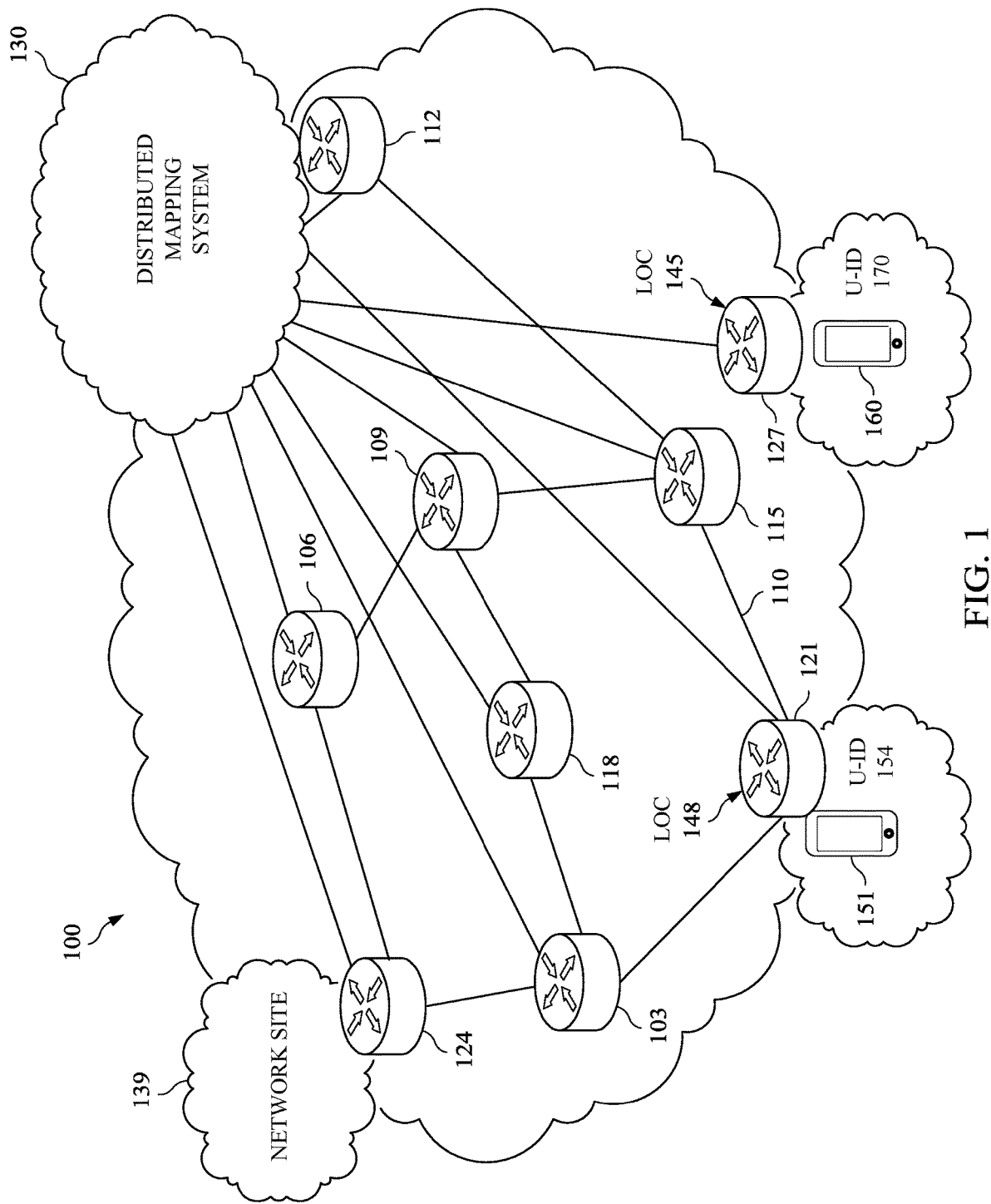
FIG. 1 illustrates an embodiment of an IEN.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Host entities in an IEN are identified using an identifier. For example, some identities may be publicly known and not anonymized, which may be referred to herein as a U-ID. A U-ID is a publicly available fixed endpoint identifier that uniquely identifies the host entity. For example, a U-ID is a numeric or alphanumeric string that is associated with a single host entity in an IEN. For example, a U-ID may be any identifier, such as a Uniform Resource Identifier (URI), a Uniform Resource Locator (URL), a Universal Unique Identifier (UUID), a Global Unique Identifier (GUID), a Bank Identifier Code (BIC), a Unique Device Identifier (UDID), a Service Set Identifier (SSID), or a National Provider Identifier (NPI). A host entity in an IEN is also identified using a locator. A locator is an address of a location by which the host entity may be reached. A host entity may register with, or associate with and authenticate with a distributed mapping system by sending the U-ID and the locator of the host entity to the distributed mapping system. The distributed mapping system may be a combination of distributed computing resources that are executed together to implement a set of services that manages identification data for various host entities, manages identifiers and locators of various host entities, and manages mappings between identifiers, locators, and/or metadata of various host entities that have registered with the distributed mapping system.

A U-ID of a host entity remains unchanged as a host entity changes locations. Therefore, host entities in IENs typically cannot remain anonymous when communicating with other host entities. Disclosed herein are embodiments directed to an IEN in which a sending host entity can remain anonymous to outside observers while providing an actual identifier of the sending host entity to the receiving host entity. In some embodiments, the sending host entity transmits data packets to the receiving host entity in which the sending host entity uses an anonymized identifier (also referred to as anonymous identifier) as the source identifier of the data packet. The sending host entity may also send a request to the distributed mapping system to send information identifying the sending host entity to the receiving host entity. The receiving host entity can be configured to determine whether to accept the data packets from the sending host entity based on the information identifying the sending host entity received from the distributed mapping system. In this way, the receiving host entity is enabled to reject packets from truly anonymous senders and unknown sources, while permitting legitimate senders to remain anonymous on the wire.

FIG. 1 illustrates an embodiment of an IEN 100. For example, the IEN 100 may be a network implementing Locator Identifier Separation Protocol (LISP), Host Identity Protocol (HIP), or any other IEN that would be recognized by one of ordinary skill in the art. LISP may be implemented according to Internet Engineering Task Force (IETF) Request for Comments (RFC) 6830, titled "The LOC/ID Separation Protocol," dated January 2013, which is hereby incorporated by reference in its entirety. HIP may be implemented according to IETF RFC 7401, titled "Host Identity Protocol Version 2 (HIPv2)," dated April 2015, which is hereby incorporated by reference in its entirety.

IEN 100 generally comprises a plurality of routers 103, 106, 109, 112, 115, and 118, and a plurality of endpoint network devices (ENDs) 121, 124, and 127 (also referred to as identifier oriented network entities). For example, ENDs 121, 124, and 127 may be a router, a switch, a bridge, a gateway, a base station, an access point, or any network device with identifier enabled networking capabilities. Host entities 151 and 160 may be communication endpoints, such as, for example, UE, a network site, or a software process that needs to be identified.

In some embodiments, routers 103, 106, 109, 112, 115, and 118 may be IP routers or label switch routers (LSRs) that are configured to interconnect ENDs 121, 124, and 127. In an embodiment, the routers 103, 106, 109, 112, 115, and 118 may be a root router, one or more provider edge (PE) routers, one or more source PE routers, one or more rendezvous point (RP) PE routers, one or more customer edge (CE) routers, or one or more core routers. For example, at least one of routers 103, 106, 109, 112, 115, and 118 may be a receiver PE router, a CE router, and/or a source PE router, which is configured to form an interface between the service provider network and one or more CE routers. The routers 103, 106, 109, 112, 115, and 118 may each be a device configured to forward data packets within a network and/or between multiple networks. For example, router 118 may be a router within a service provider network and may be configured to form a portion of a backbone or core for the service provider network.

Additionally, the routers 103, 106, 109, 112, 115, and 118 and the ENDs 121, 124, and 127 may be interconnected and in data communication with each other via one or more links 110 (e.g., a wireless link or a wired link). Further, the IEN 100 is configured to employ an IP or non-IP protocol as would be appreciated by one of ordinary skill in the art upon viewing this disclosure. In an embodiment, ENDs 121, 124, and 127 may comprise a local ID-to-locator (ID-to-LOC) mapping database and/or an anonymized ID-to-LOC mapping database, as will be further discussed below.

In an embodiment, one or more of ENDs 121, 124, and 127 may generally be characterized as a PE router where a host entity, such as host entities 151 and 160, is attached to an END such that the host entity is reachable by an END. As shown in FIG. 1, host entity 151 is associated with, or reachable by, END 121, and host entity 160 is associated with END 127. For example, network site 139 may be a host entity behind END 124. Each of the routers 103, 106, 109, 112, 115, and 118 and ENDs 121, 124, and 127 may be configured to employ a routing table, forwarding table, network table, or the like, to control and/or direct data traffic for a given network. For example, each of the routers 103, 106, 109, 112, 115, and 118 and ENDs 121, 124, and 127 may generate or establish a routing table to coordinate data communication with other routers within the IEN 100. In an example embodiment, the routing table may be established via a flooding algorithm, a spanning trees algorithm, a reverse path broadcasting algorithm, a truncated reverse path broadcasting algorithm, a reverse path multicasting algorithm, a core-based tree algorithm, or any other suitable multicast forwarding algorithm as would be appreciated by one of ordinary skill in the art upon viewing this disclosure.

The IEN 100 also includes a distributed mapping system 130 configured to execute a set of services for host entities 151 and 160 that have registered with the distributed mapping system 130, such as identifier lifecycle services, mapping services, metadata services, and other services for host entities 151 and 160. The distributed mapping system 130 may be configured to execute the set of services that together manage the lifecycle of identifiers for host entities 151 and 160, register host entities 151 and 160, map and resolve identifiers and locators of host entities 151 and 160, and obtain metadata identifying and describing host entities 151 and 160 and entity collections. For example, the distributed mapping system 130 may be a distributed GeneRic Identity Services (GRIDS) (also referred to as a General Identity Service (GRIDS)) system configured to execute GRIDS. GRIDS is a similar set of services that together manage the lifecycle of identifiers for host entities 151 and 160, register host entities 151 and 160, map and resolve identifiers and locators of host entities 151 and 160, and obtain metadata identifying and describing host entities 151 and 160 and entity collections. The GRIDS are further described in IETF draft document entitled "Requirements for Generic Identity Services in Identity Enabled Networks," dated Jul. 3, 3017, version 1, which is hereby incorporated by reference in its entirety. The set of services that are provided by the distributed mapping system 130 includes, for example, a metadata service, as will be further discussed below. In an embodiment, distributed mapping system 130 is configured to provide these services to host entities 151 and 160 that have registered with the distributed mapping system 130.

The distributed mapping system 130 may be configured to register U-IDs, advertise U-IDs, and aggregate U-IDs into a distributed database so that NEs over various geographic areas can locate a host entity 151 or 160 associated with a U-ID. In an embodiment, the distributed mapping system 130 stores ID-to-LOC mappings of all the host entities 151 and 160 and network sites 139 in IEN 100. The distributed mapping system 130 may be connected to routers 103, 106, 109, 112, 115, and 118 and ENDs 121, 124, and 127 via links 110. In an embodiment, the distributed mapping system 130 may be deployed in a cloud computing environment. For example, the distributed mapping system 130 may be deployed as an infrastructure comprising a plurality of distributed servers. The distributed mapping system 130 may include multiple access points that are located proximate to host entities 151 and 160 and/or ENDs 121, 124, and 127.

In some embodiments, the distributed mapping system 130 comprises a database storing metadata for each host entity 151 and 160, locators for each of the host entities 151 and 160, and anonymized identifiers that are being used by and sent to host entities 151 and 160. According to some embodiments, each host entity 151 and 160 is associated with one or more anonymized IDs, which may be determined by the host entity 151 and 160 itself, a third party administrator entity, or the distributed mapping system 130.

The way of anonymizing host entities 151 and 160 may be as defined in U.S. patent application Ser. No. 15/491,828, entitled "Anonymous Identity in Identity Oriented Networks and Protocols," by Padmadevi Pillay-Esnault, filed Apr. 19, 2017, which is hereby incorporated by reference in its entirety. An anonymized identifier may be any string of alphanumeric characters that identifies a host entity. The anonymized identifier is private such that the anonymized identifier may not be publicly advertised and a third party may not be able to determine that the anonymized identifier uniquely identifies a particular host entity. An anonymized identifier may be an ephemeral ID, or a temporal identifier that is fleeting in nature. For example, the anonymized identifier may be of any form, such as, for example, an IP address, a Fully Qualified Domain Name (FQDN), or a proprietary format. For example, an anonymized identifier may have a limited purpose and lifetime and may be recycled to use again to identify the host entity or another host entity. A host entity 151 or 160 may have several anonymized identifiers that identify the host entity 151 or 160 at one time. For example, different applications executing on a host entity 151 or 160 simultaneously may use different anonymized IDs. The host entity 151 or 160 may also use the U-ID and the anonymized identifiers to communicate with other host entities 151 or 160 and network sites simultaneously. The distributed mapping system 130 will maintain all the anonymized identifiers and U-IDs for each of the host entities 151 and 160 that have registered with the distributed mapping system 130. An anonymized identifier and a U-ID may be of the same format or different formats. The anonymized identifier and U-ID may not be differentiable to outside observers.

In some embodiments, each END 121, 124, and 127 identifies the U-IDs that are accessible by the END 121, 124, and 127 and sends the U-IDs in addition to the locator of the END 121, 124, and 127 to the distributed mapping system 130. As shown in FIG. 1, the U-ID 154 is an identifier assigned to host entity 151, which is communicatively coupled to END 121. END 121 has an address of locator 148 (shown as LOC 148 in FIG. 1), and therefore, the distributed mapping system 130 maps U-ID 154 to locator 148. Similarly, U-ID 170 is an identifier assigned to host entity 160, which is communicatively coupled to END 127. END 127 has an address of locator 145 (shown as LOC 145 in FIG. 1), and therefore, the distributed mapping system 130 maps U-ID 170 to locator 145.

A receiving host entity, such as host entity 151, is a host entity that receives data plane traffic from a sending host entity. A sending host entity, such as host entity 160, sends the data plane traffic to the receiving host entity. As describing herein, the sending host entity may be referred to as sending host entity 160, and the receiving host entity may be referred to as the receiving host entity 151. Before a sending host entity 160 initiates communication with a receiving host entity 151, the sending host entity 160 must send a locator request to resolve the receiving host entity's locator. The locator is a location, such as an IP address, a Media Access Control (MAC) address, or a label, of an END 121 by which the receiving host entity 151 can be reached. In some embodiments, in response to a locator request made for a receiving host entity's 151 locator, the distributed mapping system 130 will subsequently return not just the locator 148, but also the anonymized identifier which the sending host entity 160 should use to identify the receiving host entity 151. In some embodiments, host entities 151 and 160 may update the locator, request for the locator of other host entities (resolve the identifier of the other host entities for the locator), and/or register for periodic updates of locators of other host entities.

Each of the receiving host entity 151 and the sending host entity 160 is associated with a globally unique U-ID. While the global uniqueness of a U-ID is useful to handle the location separation of mobility and movement of nodes, the global uniqueness of a U-ID makes the receiving host entity 151 and the sending host entity 160 vulnerable to unwanted contact. For example, the U-ID may be included as part of packet headers, which are observable by outside observers. A global U-ID cannot hide its identity nor repel unwanted traffic. To anonymize communications, a sending host entity 160 can insert an anonymized identifier in the source identifier field of data packets. While this method of anonymity enables anonymization to outside observers, this method also prevents the receiving host entity 151 of these communications from being able to identify the sending host entity 160. There may be situations in which the receiving host entity 151 needs to authenticate the sending host entity 160 before accepting communications from the sending host entity 160.

According to some embodiments, a sending host entity 160 sends anonymized communications to a receiving host entity 151 using an anonymized ID. In some embodiments, the sending host entity 160 may reveal a true identity of the sending host entity 160 to the receiving host entity 151 by requesting the distributed mapping system 130 to send the U-ID of the sending host entity 160 to the receiving host entity 151. In some embodiments, the sending host entity 160 may request the distributed mapping system 130 to send metadata of the sending host entity 160 to the receiving host entity 151. The receiving host entity 151 may use the U-ID of the sending host entity 160 or the metadata received from the sending host entity 160 to determine whether to accept the communications having the anonymized ID.

Figure 2:
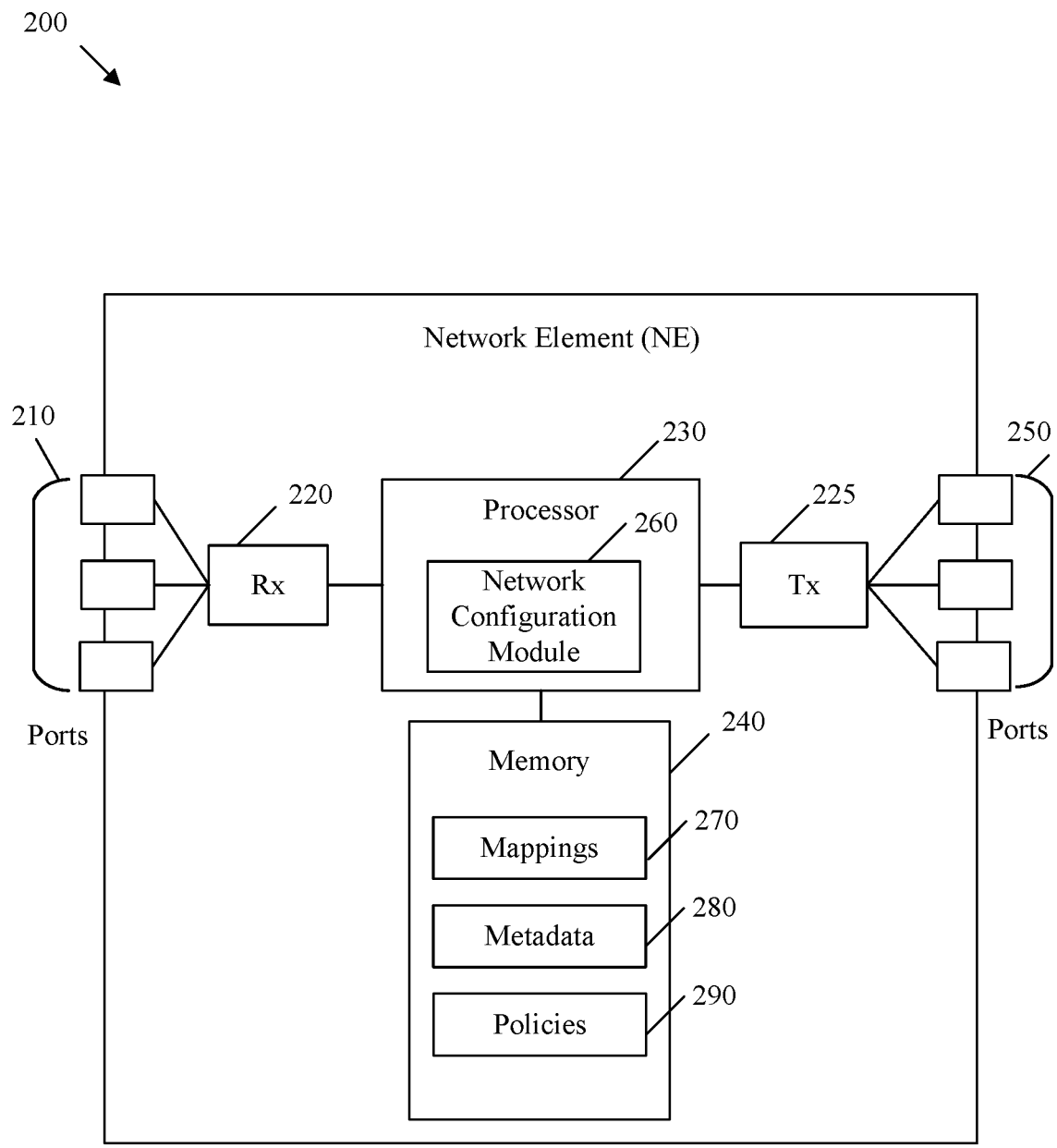
FIG. 2 is a diagram of a network element (NE) in an IEN.

FIG. 2 is a diagram of a NE 200 in an IEN. NE 200 may be similar to the distributed mapping system 130, ENDs 121, 124, and 127, and/or host entities 151 and 160. The NE 200 may be configured to implement and/or support the anonymity mechanisms described herein. The NE 200 may be implemented in a single node or the functionality of NE 200 may be implemented in a plurality of nodes. One skilled in the art will recognize that the term NE encompasses a broad range of devices of which NE 200 is merely an example. The NE 200 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 200. For instance, the features and/or methods in the disclosure may be implemented using hardware, firmware, and/or software installed to run on hardware. As shown in FIG. 2, the NE 200 comprises one or more ingress ports 210 and a receiver unit (Rx) 220 for receiving data, at least one processor, logic unit, or central processing unit (CPU) 230 to process the data, transmitter unit (Tx) 225 and one or more egress ports 250 for transmitting the data, and a memory 240 for storing the data.

The processor 230 may comprise one or more multi-core processors and coupled to a memory 240, which may function as data stores, buffers, etc. The processor 230 may be implemented as a general processor or may be part of one or more application specific integrated circuits (ASICs) and/or digital signal processors (DSPs). The processor 230 may comprise a network configuration module 260, which may perform processing functions of the host entities 151 and 160, ENDs 121, 124, and 127, or the distributed mapping system 130, as discussed more fully below, and/or any other method discussed herein. As such, the inclusion of the network configuration module 260 and associated methods and systems provide improvements to the functionality of the NE 200. Further, the network configuration module 260 effects a transformation of a particular article (e.g., the network) to a different state. In an alternative embodiment, network configuration module 260 may be implemented as instructions stored in the memory 240, which may be executed by the processor 230.

The memory 240 may comprise a cache for temporarily storing content, e.g., a random-access memory (RAM). Additionally, the memory 240 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 240 may be configured to store mappings 270, metadata 280, and policies 290. Mappings 270 may comprise the ID-to-LOC mappings and/or anonymized ID-to-LOC mappings for the host entities 151 and 160 and ENDs 121, 127, and 127 in the IEN 100. Metadata 280 may comprise metadata or information identifying host entities 151 and 160 and ENDs 121, 127, and 127 in the IEN 100. Memory 240 may store information regarding groupings of data items, such as groupings of identifiers for one or more host entities 151 and 160.

When NE 200 is a receiving host entity 151, the processor 230 may obtain information identifying the sending host entity 160 from the distributed mapping system 130. The memory 240 may store this information. The Rx 220 may receive data packets from the sending host entity 160 including an anonymized ID. A processor 230 of the receiving host entity 151 determines whether to accept the data packet based on a comparison of the anonymized identifier with the information received from the distributed mapping system 130. When NE 200 is an END 127 acting on behalf of the receiving host entity 151, the processor 230, memory 240, Tx 225, and Rx 220 perform similar functions.

When NE 200 is a sending host entity 160, the Tx 225 may send a request to the distributed mapping system 130, where the request is for the distributed mapping system 130 to send information identifying the sending host entity 160 to the receiving host entity 151. The Tx 225 may send data packets to the receiving host entity 151 or an END 121 attached to the receiving host entity 151. The data packets may include an anonymized identifier in the source identifier field of a header of the data packets. When NE 200 is an END 121 acting on behalf of the sending host entity 160, the processor 230, memory 240, Tx 225, and Rx 220 perform similar functions.

When NE 200 is the distributed mapping system 130, the Rx 220 receives the request from the sending host entity 160 or END 127 acting on behalf of the sending host entity 160. The request is for the distributed mapping system 130 to send information identifying the sending host entity 160 to the receiving host entity 151. The memory 240 of the distributed mapping system 130 stores the request and information identifying the sending host entity 160. Tx 225 provides the information identifying the sending host entity 160 to the receiving host entity 151. In some embodiments, NE 200 may be a data center or cloud fabric with several processor 230s and memory 240s interconnected to one another. In some embodiments, Tx 225 and Rx 220 may be one or more data center gateways.

It is understood that by programming and/or loading executable instructions onto the NE 200, at least one of the processor 230 and/or memory 240 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

Figure 3:
FIG. 3 is a diagram illustrating the information that a distributed mapping system maintains to provide metadata services to host entities.

FIG. 3 is a diagram illustrating the information 300 that distributed mapping system 130 maintains to provide metadata services to the host entities 151 and 160. The distributed mapping system 130 may store data associated with multiple host entities 151 and 160, where each host entity is associated with an identity. As shown in FIG. 3, sending host entity 160 is associated with the identity 306 and the receiving host entity 151 is associated with the identity 330. An identity 306 or 330 is a private identifier or reference to a host entity 160 or 151 that may not be used on the data plane or shared with other endpoints. Identities 306 and 330 are not the same as a U-ID or an anonymized identifier because U-IDs and anonymized identifiers are not necessarily tied to the lifecycle of the host entity 160 and 151 to which the U-IDs and anonymized identifiers are referring. The identity 306 or 330 of a host entity 160 and 151 may be private so that only the distributed mapping system 130 may obtain an identity of a host entity 160 and 151.

In an embodiment, each identity 306 and 330 has associated metadata 316 and 333. For example, the identity 306 of the sending host entity 160 is associated with metadata 316. The metadata 316 may include information identifying the sending host entity 160. For example, the metadata 316 may include a type of entity of the sending host entity 160. The type of entity may indicate a type of device of the sending host entity 160. For example, the type of device may be a UE, mobile phone, Internet of Things (IoT) device, wearable device, network site, or data center. The metadata 316 may also include a classification of whether the sending host entity 160 is "trustworthy" or not. This classification may be determined by the distributed mapping system 130 or by a third party.

The metadata 316 and 333 may also include a token received from the host entity. For example, the sending host entity 160 may have received a token from the receiving host entity 151. The token may be an authorization that the receiving host entity 151 grants to the sending host entity 160, and the token may indicate that the sending host entity 160 is a legitimate host entity. When the sending host entity 160 receives the token from the receiving host entity 151, the sending host entity 160 may send the token to the distributed mapping system 130. The token may be stored in metadata 316.

Identity 306 of the sending host entity 160 is also associated with the U-ID 321, locators 323, and anonymized identifiers 326. U-ID 321 may be the U-ID 170 of the sending host entity 160, locators 323 may include one or more locators by which the sending host entity 160 may be reached at, and anonymized identifiers 326 may include one or more anonymized identifiers that is temporarily being used to identify the sending host entity 160. Identity 330 of the receiving host entity 151 is also associated with similar metadata 333, U-ID 336, locators 339, and anonymized identifiers 341.

The distributed mapping system 130 may be configured to receive the metadata, U-ID, locators, and anonymized identifiers from a host entity when the host entity registers with the distributed mapping system 130. For example, the metadata 333 may be received when the receiving host entity 151 registers with the distributed mapping system 130. For example, the receiving host entity 151 may register with the distributed mapping system 130 by sending a message with the U-ID 336 of the receiving host entity 151. The distributed mapping system 130 may authenticate the receiving host entity 151 and send a confirmation message back to the receiving host entity 151. At this point, the distributed mapping system 130 may obtain metadata 333 associated with the receiving host entity 151.

In an embodiment, the receiving host entity 151 may then send additional information to the distributed mapping system 130 after subscription. For example, the receiving host entity 151 or END 121 acting on behalf of the receiving host entity 151 may send locators 339 and anonymized identifiers 341 to the distributed mapping system 130. The distributed mapping system 130 is configured to store the metadata 333, U-ID 336, locators 339, and anonymized identifiers 341 in association with the identity 330 of the receiving host entity 151. In an embodiment, the receiving host entity 151 or END 121 acting on behalf of the receiving host entity 151 may transmit updates to metadata 333, U-ID 336, locators 339, and anonymized identifiers 341 to the distributed mapping system 130. The distributed mapping system 130 is configured to update the metadata 333, U-ID 336, locators 339, and anonymized identifiers 341 in association with the identity 330 of the receiving host entity 151 accordingly.

While information 300 that is maintained at the distributed mapping system 130 only shows metadata, U-IDs, locators, and anonymized identifiers being stored in association with a host entity, it should be appreciated that many other types of information may be stored in association with a host entity. In an embodiment, the distributed mapping system 130 is configured to provide GRIDS to registered host entities using the information 300.

Figure 4:
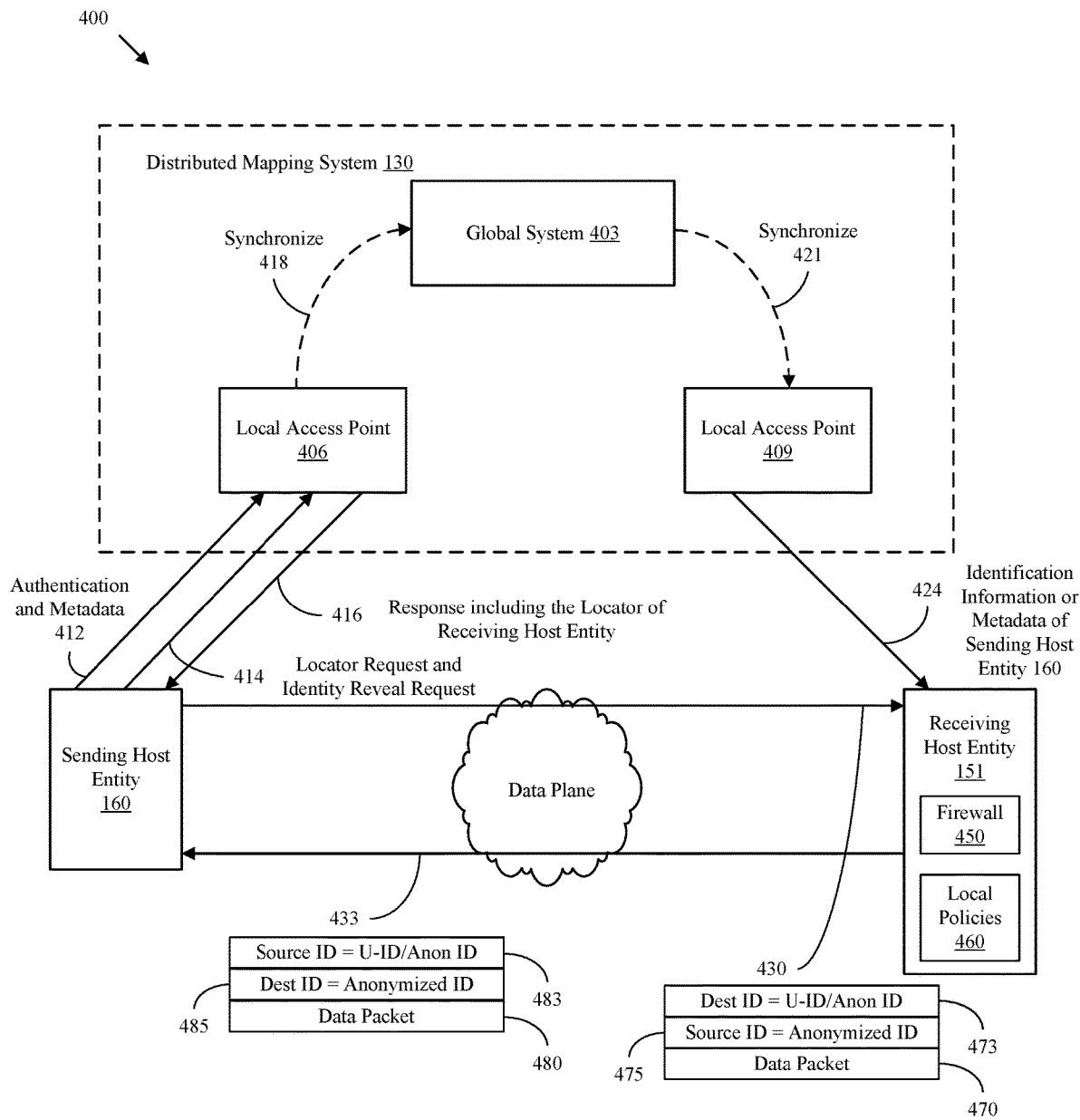
FIG. 4 illustrates an IEN implementing smart sender anonymization using a host based communication scheme according to an embodiment of the disclosure.

FIG. 4 illustrates an IEN 400 implementing smart sender anonymization using a host based communication scheme according to an embodiment of the disclosure. For example, IEN 400 is similar to IEN 100, except that IEN 400 implements a host based communication scheme, such as HIP, where host entities 151 and 160 can communicate directly with the distributed mapping system 130 without the use of ENDs 121 and 127. As shown FIG. 4, IEN 400 includes the distributed mapping system 130, the receiving host entity 151, and the sending host entity 160. The distributed mapping system 130 includes a local access point 406 and a local access point 409. Local access point 406 may be located proximate to the sending host entity 160 such that the local access point 406 serves the sending host entity 160. Similarly, local access point 409 may be located proximate to the receiving host entity 151 such that the local access point 409 serves the receiving host entity 151. The local access point 406 and local access point 409 each communicate and synchronize with the global system 403. The global system 403 synchronizes and consolidates information received from both the local access point 406 and local access point 409. While only two host entities 151 and 160 and two local access points 406 and 409 are shown in FIG. 4, it should be appreciated that any number of host entities and local access points may be part of IEN 400.

At arrow 412, the sending host entity 160 authenticates with the local access point 406 and sends metadata 316 describing and identifying the sending host entity 160. For example, a Tx 225 of the sending host entity 160 sends information to authenticate with the local access point 406. In one embodiment, the sending host entity 160 may first authenticate with the local access point 406 upon initial registration with the distributed mapping system 130 by setting up an authentication scheme involving a token or a password, for example. Subsequently, when the sending host entity 160 initiates communication with the local access point 406, the sending host entity 160 may need to perform the authentication scheme before requesting the distributed mapping system 130 to perform an action. The sending host entity 160 may also send the metadata 316 describing and identifying the sending host entity 160 either during registration with the distributed mapping system 130 or subsequent to the registration.

In some embodiments, the messages sent at arrow 412 may further include a U-ID of the sending host entity 160, a current locator of the sending host entity 160, and one or more anonymized identifiers of the sending host entity 160. In some embodiments, the messages sent at arrow 412 may be sent by the sending host entity 160 at any time regardless of whether the receiving host entity 151 is changing locations. In an embodiment, the messages sent at arrow 412 may be a new message that the sending host entity 160 sends to the local access point 406. In an embodiment, the messages sent at arrow 412 may be an extension of a pre-existing message for HIP as defined in RFC 7401.

At arrow 414, the sending host entity 160 sends a locator request and identity reveal request to the local access point 406. For example, the Tx 225 of the sending host entity 160 may send the locator request and the identity reveal request to the local access point 406 at the same time, or at different times. The locator request may be a request for a current locator of the receiving host entity 151 to enable the sending host entity 160 to send data traffic to the receiving host entity 151 at the correct location. For example, the locator request may include the U-ID of the receiving host entity 151 in response to the sending host entity 160 previously obtaining the U-ID of the receiving host entity 151. In an embodiment, the locator request may be a new message that the sending host entity 160 sends to the local access point 406. In an embodiment, the locator request may be a pre-existing message for HIP as defined in RFC 7401.

The identity reveal request may be a request for the distributed mapping system 130 to send information identifying the sending host entity 160 to the receiving host entity 151. The information identifying the sending host entity 160 may include a mapping of the U-ID of the sending host entity 160 to the anonymized identifier of the sending host entity 160, metadata 316, and/or other information that otherwise describes or identifies the sending host entity 160. The identity reveal request may also include the U-ID of both the sending host entity 160 and the receiving host entity 151. In an embodiment in which the identity reveal request is sent after the sending host entity 160 receives the current locator of the receiving host entity 151, the identity reveal request may include the current locator of the receiving host entity 151.

In one embodiment, the identity reveal request may be a request for the distributed mapping system 130 to reveal a true identity of the sending host entity 160 to the receiving host entity 151. For example, the identity reveal request may be a request to send, to the receiving host entity 151, a mapping of the U-ID of the sending host entity 160 and the anonymized identifier that the sending host entity 160 uses to communicate with the receiving host entity 151. In another embodiment, the identity reveal request may be a request for the distributed mapping system 130 to send, to the receiving host entity 151, metadata 316 and/or other information that describes the sending host entity 160. The metadata 316 and/or other information that describes the sending host entity 160 can be used by the receiving host entity 151 to determine whether to accept data packets from the sending host entity 160.

While FIG. 4 shows the sending host entity 160 sending the locator request and the identity reveal request together, it should be appreciated that the locator request and the identity reveal request may be sent at separate times. In an embodiment, the identity reveal request may be a new message that the sending host entity 160 sends to the local access point 406. In an embodiment, the identity reveal request may be a pre-existing message for HIP as defined in RFC 7401. In an embodiment, the identity reveal request and the locator request may be included together as a single new message that the sending host entity 160 sends to the local access point 406. In an embodiment, the identity reveal request and the locator request may be included together in a single pre-existing message for HIP as defined in RFC 7401.

At arrow 416, a response is sent from the local access point 406 to the sending host entity 160 after the local access point 406 receives the locator request and/or identity reveal request. For example, a Tx 225 of the local access point 406 transmits the response to the sending host entity 160. The response may include an acknowledgement (ACK) or a negative acknowledgement (NACK) that indicates whether or not the local access point 406 successfully received the identity reveal request and will send the information identifying the sending host entity 160. The response may also include the current locator of the receiving host entity 151 if the identity reveal request and locator request are sent to the local access point 406 together. The response may also include other information related to the processing of the messages sent by the sending host entity 160. In an embodiment, the response may be a new message that the local access point 406 sends to the sending host entity 160. In an embodiment, the identity response may be a pre-existing message for HIP as defined in RFC 7401.

At arrow 418, the local access point 406 may send the information received in the message from the sending host entity 160 to the global system 403 and synchronize with the global system 403. For example, a Tx 225 of the local access point 406 sends the information and requests from the sending host entity 160 to the global system 403. In an embodiment, the information may be sent in a new message that the sending host entity 160 sends to the local access point 406. In an embodiment, the information may be included in a pre-existing message for HIP as defined in RFC 7401.

The global system 403 may store the metadata 316 and/or other information identifying the sending host entity 160 in association with the identity of the sending host entity 160 in a manner similar to that described with reference to FIG. 3. At arrow 421, the global system 403 may synchronize with the local access point 409. For example, a Tx 225 of the global system 403 may send the information and requests to the local access point 409 indicating that the sending host entity 160 is requesting the distributed mapping system 130 to reveal information associated with the identity of the sending host entity 160 to the receiving host entity 151.

At arrow 424, the local access point 409 sends the information identifying and describing sending host entity 160 to the receiving host entity 151. For example, Tx 225 of the local access point 409 sends the mapping of the U-ID of the sending host entity 160 to the anonymized identifier of the sending host entity 160, metadata 316, or other information identifying the sending host entity 160 to the receiving host entity 151. In an embodiment, the local access point 409 may store the mapping of the U-ID of the sending host entity 160 to the anonymized identifier of the sending host entity 160, metadata 316, or other information identifying the sending host entity 160. The global system 403 may also update the database to indicate that a request to reveal the identity of the sending host entity 160 has been sent to the receiving host entity 151.

In an embodiment, the receiving host entity 151 may store the information identifying the sending host entity 160 locally in a memory 240 of the receiving host entity 151. In an embodiment, a firewall 450 executed by the receiving host entity 151 may use the information identifying the sending host entity 160 to determine whether to accept data packets from the sending host entity 160. The firewall 450 may be executed by the receiving host entity 151 and be configured to monitor and control incoming and outgoing network traffic based on the local policies 460. For example, the receiving host entity 151 may determine and store local policies 460 that define information or metadata 316 of sending host entities 160 that may send data packets to the receiving host entity 151 and information or metadata 316 of sending host entities 160 that may not be permitted to send data packets to the receiving host entity 151. The local policies 460 may be defined based on a U-ID of the sending host entity 160, anonymized identifiers of the sending host entity 160, the metadata 316 of the sending host entity 160, locators of the sending host entity 160, and/or any other data or feature of the sending host entity 160.

When a local policy 460 is defined based on a U-ID or an anonymized identifier of the sending host entity 160, the local policy 460 may indicate whether to accept or reject packets having a predefined U-ID or anonymized ID. For example, a local policy 460 may indicate that data packets that are received from a sending host entity 160 having a specific U-ID should always be rejected or accepted. The determination of the U-ID associated with the anonymized identifier present in the header of the data packet may be made based on the information identifying the sending host entity 160 received from the local access point 409.

When a local policy 460 is defined based on metadata 316, the local policy 460 may indicate whether to accept or reject packets based on whether certain metadata 316 is associated with the sending host entity 160. For example, a local policy 460 may indicate that the receiving host entity 151 will not accept data packets from IoT devices. In this case, the firewall 450 may be configured to determine whether metadata 316 describing the sending host entity 160 received from the local access point 409 indicates that the sending host entity 160 is an IoT device. The firewall 450 is configured to reject data packets that are received from the sending host entity 160 when the metadata 316 indicates that the sending host entity 160 is an IoT device. The firewall 450 may also be configured to accept data packets that are received from the sending host entity 160 when the metadata 316 indicates that the sending host entity 160 is not an IoT device.

In an embodiment, a local policy 460 may be defined based on tokens that the receiving host entity 151 has previously sent to sending host entities 160. For example, at some point before the sending host entity 160 transmits data packets to the receiving host entity 151, the receiving host entity 151 may have sent a token to the sending host entity 160. The token may indicate that the sending host entity 160 is authorized to communicate with the receiving host entity 151. The token may include one or more private or public signatures that verify that the receiving host entity 151 has authorized the communications. In an embodiment, the sending host entity 160 may send the token to the distributed mapping system 130, for example, at arrow 412, such that the distributed mapping system 130 may send the token back to the receiving host entity 151 if needed. In an embodiment, the firewall 450 may be configured to accept data packets from the sending host entity 160 when the receiving host entity 151 has received the token from the local access point 409. In an embodiment, the firewall 450 may be configured to reject data packets from the sending host entity 160 if the receiving host entity 151 has not previously sent a token to the sending host entity 160. In an embodiment, a gateway receives the data packets from the sending host entity 160 after the firewall has determined to accept the data packets. In an embodiment, the gateway may be configured to replace the anonymized identifier in the source identifier field with the U-ID of the sending host entity. In one embodiment, the gateway may be associated with the global mapping system 130 such that the gateway acts as a proxy on behalf of the receiving host entity 151.

At arrow 430, the sending host entity 160 may begin to send data packets 470 to the receiving host entity 151, and the data packets 470 may include a source identifier field 475 that includes an anonymized identifier instead of the U-ID of the sending host entity 160. For example, Tx 225 of the sending host entity 160 may transmit data packets 470 to the receiving host entity 151. In an embodiment in which IEN 400 implements IPv4 or IPv6, the data packets 470 may include an outer IP header. The outer IP header may include a source IP address field and a destination IP address field. For the data packets 470 that are sent at arrow 430, the source IP address field may include the IP address of the sending host entity 160 and the destination IP address field may include the locator of the receiving host entity 151 provided by the local access point 409. In this case, the locator of the receiving host entity 151 may be an IP address. In an embodiment, the outer IP header may also include a source identifier field 475 and a destination identifier field 473 of the data packet 470. For the data packets 470 that are sent at arrow 430, the source identifier field 475 may include an anonymized identifier of the sending host entity 160 and the destination identifier field 473 may include the U-ID or a preferred anonymized identifier of the receiving host entity 151, as specified by the receiving host entity 151. In this way, the sender of the data packets 470, or the sending host entity 160, is anonymized to outside observers of the data packet 470. However, because the receiving host entity 151 has receiving information identifying the sending host entity 160 at arrow 424, the sending of the data packets 470 will not be anonymized to the receiving host entity 151.

When the receiving host entity 151 receives the data packets 470 from the sending host entity 160, the receiving host entity 151 may filter out data packets 470 that do not conform to the local policies 460 using the firewall 450. For example, suppose the receiving host entity 151 has obtained and stores the mapping of the U-ID of the sending host entity 160 with the anonymized identifier that is used in the data packets 470 from the local access point 409. In this case, the firewall 450 may determine a local policy 460 that applies to the U-ID of the sending host entity 160. The firewall 450 may determine whether to accept or reject data packets 470 based on the local policy 460 that applies to the U-ID of the sending host entity 160.

As another example, suppose the receiving host entity 151 has obtained and stores metadata 316 describing and identifying the sending host entity 160. In this case, the firewall 450 may determine a local policy 460 that applies to one or more of the items of metadata 316 of the sending host entity 160. The firewall 450 may determine whether to accept or reject data packets 470 based on the local policy 460 that applies to the one or more items of metadata 316 if a local policy 460 applies to the one or more items of metadata 316. In an embodiment, a gateway may receive data packet 470 after the firewall 450 has determined to accept the data packet 470. In an embodiment, the gateway may be configured replace the anonymized identifier in the source identifier field 475 in the header of the data packet 470 with the U-ID of the sending host entity 160.

At arrow 433, the receiving host entity 151 may send data packets 480 back to the sending host entity 160, and the data packets 480 may include the anonymized identifier in the destination identifier field 485 of the data packet 480. In some embodiments, the anonymized identifier is inserted in the destination identifier field 485 instead of the U-ID of sending host entity 160. In some embodiments, the source identifier field 483 includes either the U-ID of the receiving host entity 151 or an anonymized identifier of the receiving host entity 151, as specified by the receiving host entity 151. For example, Tx 225 of the receiving host entity 151 may transmit data packets 480 to the sending host entity 160. With this method, communication between the receiving host entity 151 and a sending host entity 160 within IEN 400 can be completely anonymous to outside observers in the IEN 400 while enabling the receiving host entity 151 to determine whether the sending host entity 160 is a legitimate host or not.

Figure 5:
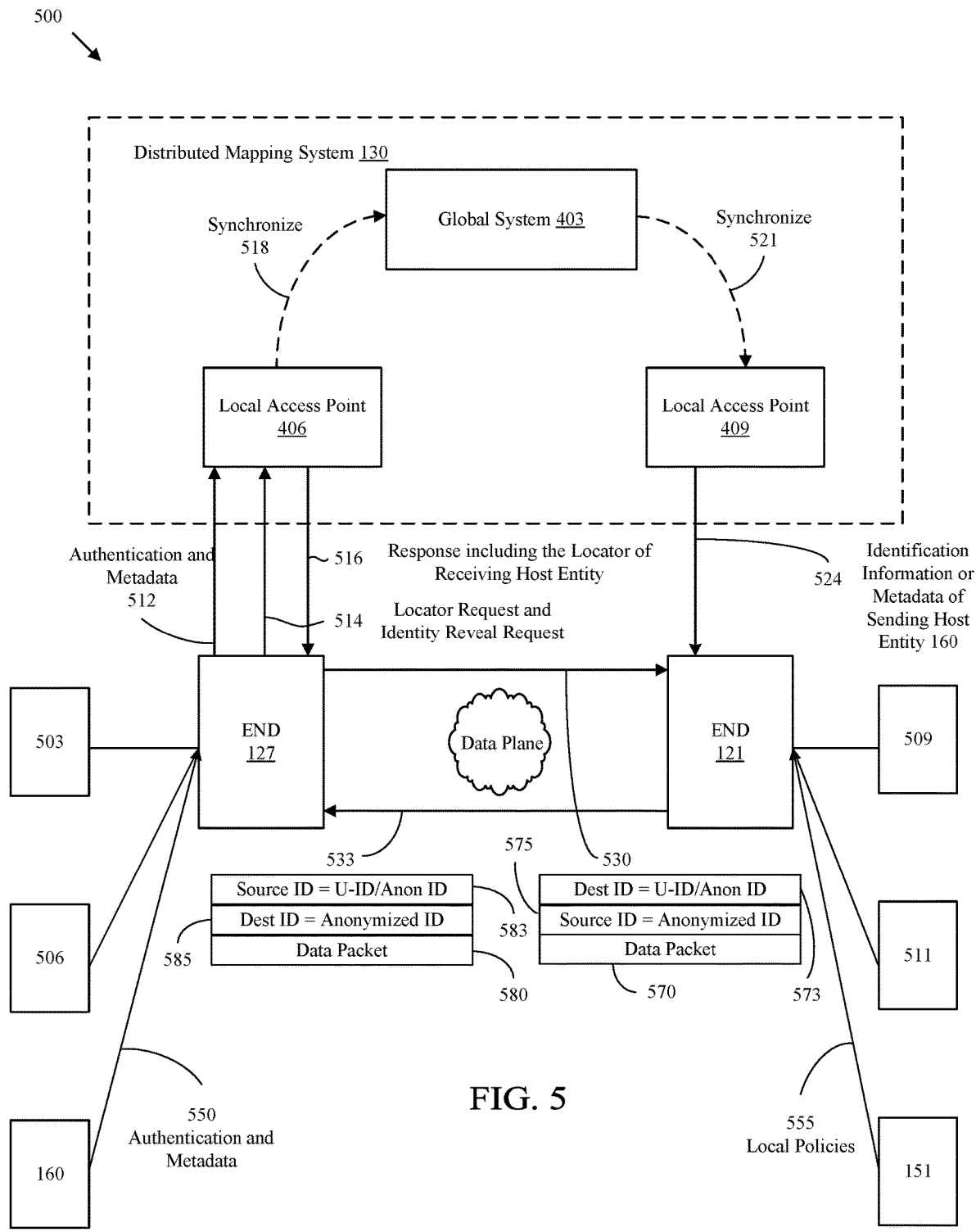
FIG. 5 illustrates an IEN implementing smart sender anonymization using a network device based communication scheme according to an embodiment of the disclosure.

FIG. 5 illustrates an IEN 500 implementing smart sender anonymization using a network device based communication scheme according to an embodiment of the disclosure. For example, IEN 500 is similar to IEN 400, except that IEN 500 implements a network device based communication scheme, such as LISP, where ENDs 121 and 127 communicate with each other and the distributed mapping system 130 on behalf of host entities 151 and 160. Otherwise, the data transmitted between the host entities 151 and 160, ENDs 121 and 127, and distributed mapping system 130 are similar to that which is discussed in FIG. 4. IEN 500 shows multiple host entities 503, 506, and 160 that are associated with, or reachable via, END 127 and multiple host entities 509, 511, and 151 that are associated with END 121. In the above case, identifier capabilities for the host entities 151 and 160 are obtained and stored by the respective ENDs 121 and 127, and host entities 151 and 160 connected to these ENDs 121 and 127 will have anonymous communication among them through the ENDs 121 and 127.

At arrow 550, the sending host entity 160 authenticates with the distributed mapping system 130 via END 127 and sends metadata 316 describing and identifying the sending host entity 160 to END 127. For example, a Tx 225 of the sending host entity 160 sends the message to the END 127. The content of the message may be substantially the same as the content of the message sent at arrow 412 of FIG. 4. In an embodiment, END 127 may store and maintain the metadata 316 sent from the sending host entity 160. The stored information may be used to setup a local policy 460 to rate limit traffic with source identifiers or implement a security measure not to receive any traffic if the header of the packets received does not include a source identifier that is recognized by the sending host entity 160 when the sending host entity 160 receives packets. The messages sent at arrow 550 may be new messages that END 127 sends to the distributed mapping system 130, or may be a part of a pre-existing message for LISP as defined in RFC 6830.

At arrow 512, END 127 forwards the authentication and metadata 316 to the local access point 406 on behalf of the sending host entity 160. For example, a Tx 225 of the END 127 sends the authentication and metadata 316 to the local access point 406. The content of the message may be substantially the same as the content of the message sent at arrow 412 of FIG. 4.

At arrow 514, END 127 sends a locator request and identity reveal request to the local access point 406. For example, the Tx 225 of END 127 may send the locator request and the identity reveal request to the local access point 406 at the same or different times. The content of the locator request and the identity reveal request may be substantially the same as the locator request and the identity reveal request described at arrow 414 of FIG. 4.

At arrow 516, the local access point 406 sends a response to the END 127 after the local access point 406 receives the authentication and metadata 316. For example, a Tx 225 of the local access point 406 transmits the authentication and metadata 316. The content of the response may be substantially the same as the content of the response sent at arrow 415 of FIG. 4. The response sent at arrow 516 may be new messages that the local access point 406 sends to END 127, or may be a part of a pre-existing message for LISP as defined in RFC 6830.

While FIG. 5 shows the END 127 sending the locator request and the identity reveal request together, it should be appreciated that the locator request and the identity reveal request may be sent at separate times. In an embodiment, the identity reveal request may be a new message that the END 127 sends to the local access point 406. In an embodiment, the identity reveal request may be a pre-existing message for LISP as defined in RFC 6830. In an embodiment, the identity reveal request and the locator request may be included together as a single new message that the END 127 sends to the local access point 406. In an embodiment, the identity reveal request and the locator request may be included together in a single pre-existing message for LISP as defined in RFC 6830. In an embodiment, the locator request and identity reveal request sent at arrow 514 may be an extension of a pre-existing message for LISP as defined in RFC 6830 such that the identity reveal request is included in the locator request, or map request as defined by LISP.

At arrow 516, a response is sent from the local access point 406 to the END 127 after the local access point 406 receives the locator request and/or identity reveal request. For example, a Tx 225 of the local access point 406 transmits the response to the END 127. The content of the response is substantially the same as the content of the response sent at arrow 416 of FIG. 4. In an embodiment, the response sent at arrow 516 may be a new message that the local access point 406 sends to END 127. In an embodiment, the response sent at arrow 516 may be an extension of a pre-existing message for LISP as defined in RFC 6830.

Arrows 518 and 521 are substantially the same as arrows 418 and 421 described with reference to FIG. 4. The local access point 406 synchronizes the information received from the END 127 with the global system 403 and the local access point 409. At arrow 555, the receiving host entity 151 sends one or more local policies 460 to the END 121. For example, Tx 225 of the receiving host entity 151 may send the local policies 460 to the END 121. The local policies 460 may be implemented by a firewall 450 which may be executed by a processor 230 at END 121. At arrow 524, the local access point 409 sends the information identifying and describing sending host entity 160 to the END 127. For example, Tx 225 of the local access point 409 may send the mapping of the U-ID of the sending host entity 160 to the anonymized identifier of the sending host entity 160, metadata 316, or other information identifying the sending host entity 160 to the END 121. The content of the information identifying and describing sending host entity 160 may also be substantially the same as the information identifying and describing sending host entity 160 sent at arrow 424 of FIG. 4. In an embodiment, the information sent at arrow 524 may be a new message that the local access point 409 sends to END 121. In an embodiment, the information sent at arrow 524 may be an extension of a pre-existing message for LISP as defined in RFC 6830.

At arrow 530, the END 127 may send data packets 570 to the END 121 on behalf of the sending host entity 160. For example, Tx 225 of the END 127 may transmit data packets 570 to the END 121. The data packets 570 may include a source identifier field 575 that includes an identifier instead of the U-ID of the sending host entity 160. The data packets 570 may also include a U-ID or an anonymized identifier of the receiving host entity 151 in the destination identifier field 573, as specified by the receiving host entity 151. The data packets 570 may be substantially the same as the data packets 470 sent at arrow 430 of FIG. 4. In an embodiment, the END 127 may receive the data packets 570 from the sending host entity 160. In an embodiment, the END 127 may insert the anonymized identifier as the source identifier in the outer header of the data packets 570. In an embodiment, the END 127 may also insert the locator of the receiving host entity 151 as the address of the destination in the outer header of the data packets 570.

In an embodiment, Rx 220 of END 121 receives the data packets 570 from END 127. In an embodiment, network configuration module 260 and the firewall 450 may determine whether the data packets 570 from END 127 may be accepted by the receiving host entity 151 based on the local policies 460 of the receiving host entity 151. The END 121 may only forward the data packets 570 with an anonymized identifier in the source identifier field 575 that are indicated as acceptable by the local policies 460 for the receiving host entity 151. In this way, data packets 570 that do not have the authorized anonymized identifiers are not forwarded to the receiving host entity 151 and thus are dropped.

At arrow 533, END 121 may send data packets 580 back to END 127 on behalf of the receiving host entity 151. For example, Tx 225 of the END 121 may transmit data packets 580 to the END 127. In an embodiment, the data packets 580 may first be sent from the receiving host entity 151, and the END 121 may include the anonymized identifier in the destination identifier field 585 of the data packets 580 before forwarding the data packets 580 to the END 127. The data packets 580 may include the U-ID or the anonymized identifier of the receiving host entity 151 in the source identifier field 583, as specified by the receiving host entity 151. The data packets 580 sent at arrow 533 may be substantially the same as the data packets 480 sent at arrow 433 of FIG. 4.

Although END 121 is only described as communicating on behalf of receiving host entity 151, END 121 may also communicate on behalf of host entities 509 and 511 as needed. Similarly, END 127 may also communicate on behalf of host entities 503 and 506 as needed. ENDs 121 and 127 may also be configured to enforce the local policies to limit data traffic unless the data packets 570 and 580 are anonymized per the local policies 460 set by receiving host entity 151.

Figure 6:
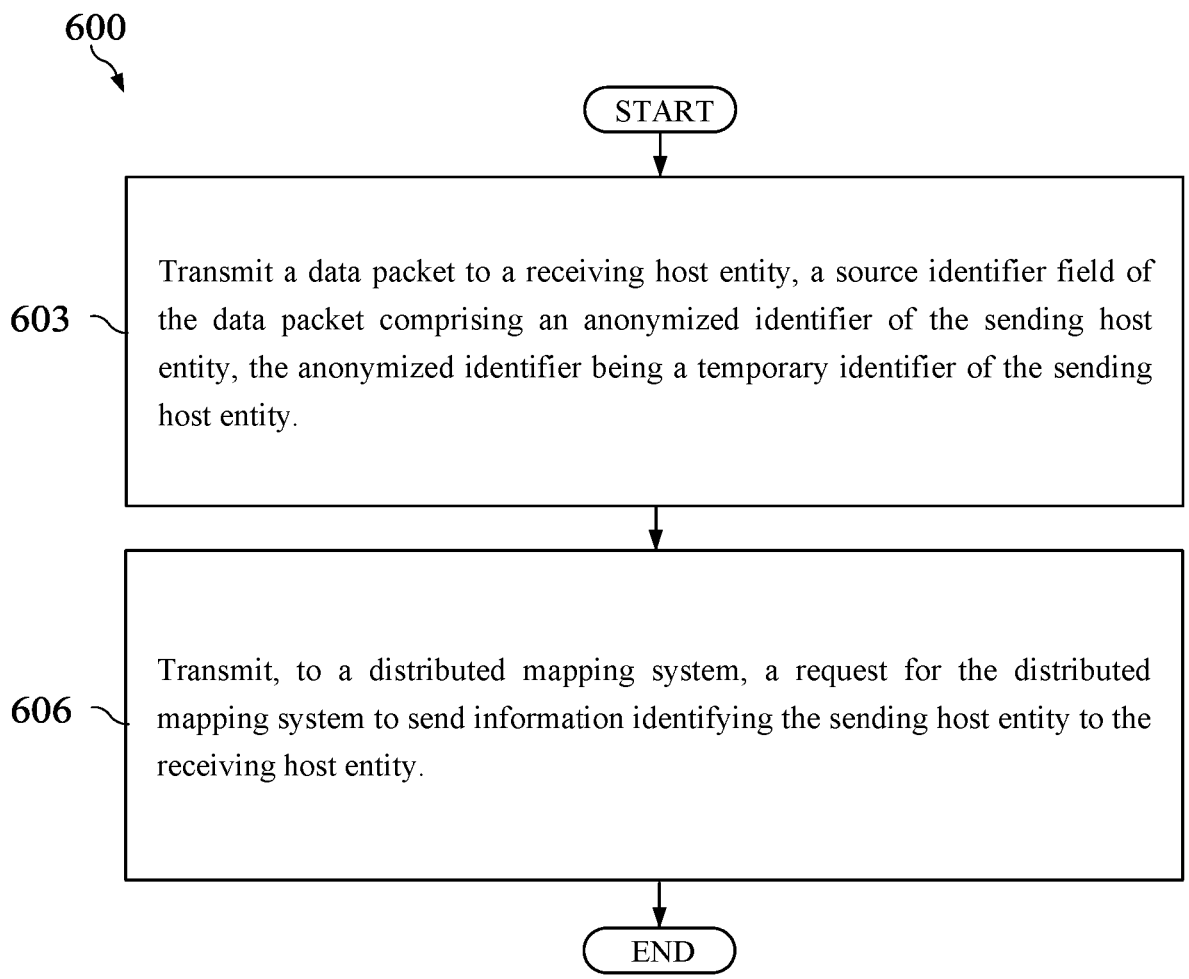
FIG. 6 is a method directed to receiver directed anonymization in an IEN according to an embodiment of the disclosure.

FIG. 6 is a method 600 directed to smart sender anonymization in an IEN. Method 600 may be implemented by an NE 200 in an IEN 100. The NE 200 may be implemented as either the receiving host entity 151 or the END 121 acting on behalf of the receiving host entity 151. For example, method 600 is implemented after the receiving host entity 151 has completed subscription with the distributed mapping system 130. At block 603, a data packet is transmitted to the receiving host entity. For example, a Tx 225 of sending host entity 160 directly transmits the data packet 430 to the receiving host entity 151, as shown in FIG. 4. Alternatively, Tx 225 of the END 127 may transmit the data packet 530 to END 121, as shown in FIG. 5. The data packet may include an anonymized identifier in a source identifier field of a header of a data packet.

At block 606, a request for the distributed mapping system to send information identifying the sending host entity to the receiving host entity is sent to the distributed mapping system. For example, the Tx 225 of the sending host entity 160 sends the request directly to the distributed mapping system 130, as shown in FIG. 4. Alternatively, the Rx 220 of END 127 may send the request to the distributed mapping system 130 on behalf of the sending host entity 160. In an embodiment, the request may be for the distributed mapping system 130 to send a U-ID of the sending host entity 160 to the receiving host entity 151. In an embodiment, the request may be for the distributed mapping system 130 to send metadata 316 of the sending host entity 160 to the receiving host entity 151. In an embodiment, the request may be for the distributed mapping system 130 to send a token authorizing the sending host entity 160 to the receiving host entity 151.

In an embodiment, the sending host entity 160 may use the anonymized identifier in communications with one receiving host entity 151 and use the U-ID in communications with another receiving host entity 151. For example, the sending host entity 160 may send data packets to another receiving host entity 151. The data packets may include the U-ID in the source identifier field of the data packets. The sending host entity 160 can be anonymized to certain receiving host entities 151 while simultaneously sending data to other receiving host entities 151 using the true identity.

Figure 7:
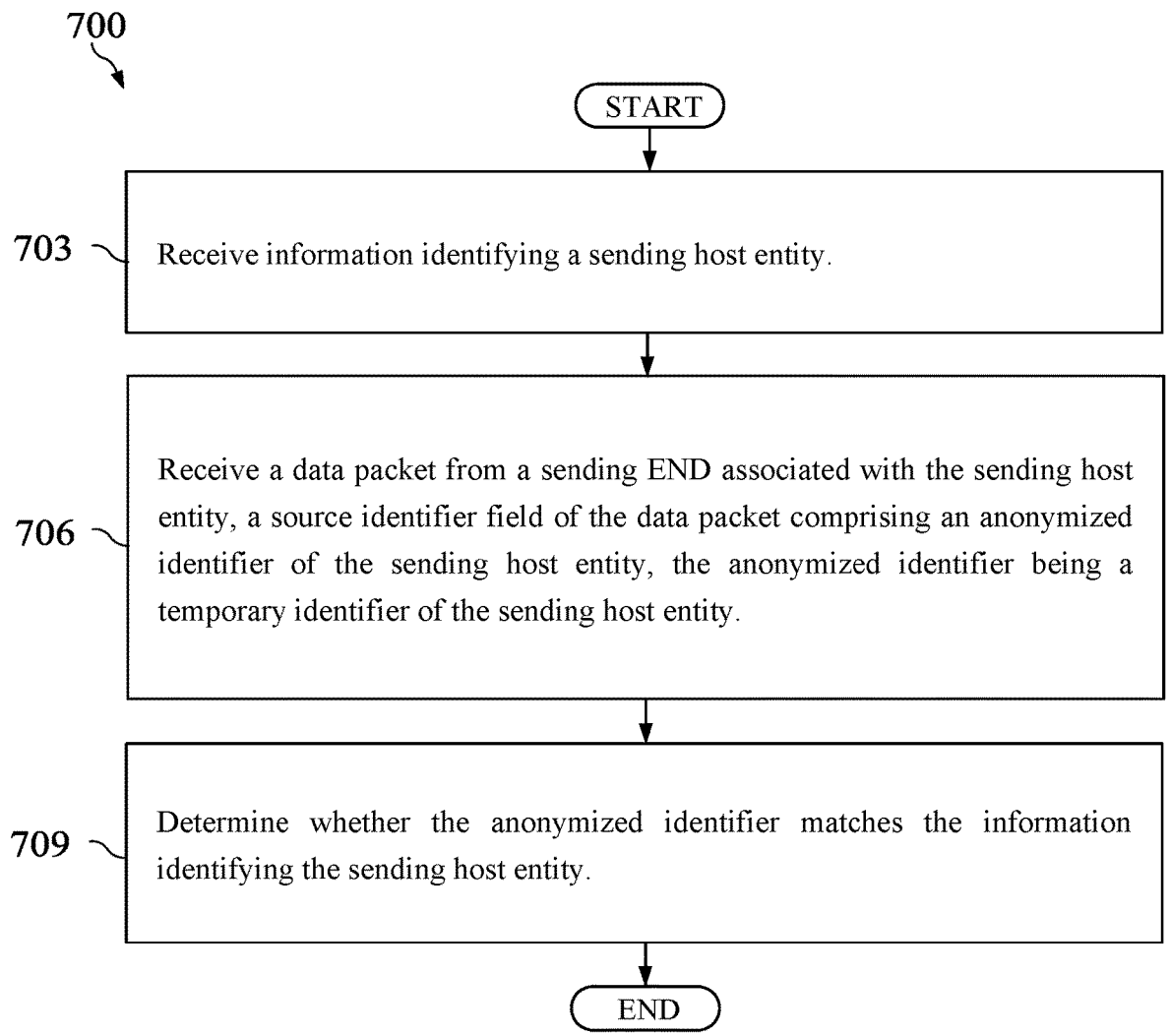
FIG. 7 is a method directed to receiver directed anonymization in an IEN according to an embodiment of the disclosure.

FIG. 7 is a method 700 directed to smart sender anonymization in an IEN. Method 700 may be implemented by an NE 200 in an IEN 100. The NE 200 may be implemented as either the receiving host entity 151 or the END 121 acting on behalf of the receiving host entity 151. For example, method 700 is implemented after the receiving host entity 151 has completed subscription with the distributed mapping system 130. At block 703, information identifying a sending host entity is received by the receiving host entity. For example, the Rx 220 of the receiving host entity 151 may receive information identifying the sending host entity 160 from the distributed mapping system 130, as shown in FIG. 4. Alternatively, the Rx 220 of the END 121 may receive the information identifying the sending host entity 160 from the distributed mapping system 130, as shown in FIG. 5. In an embodiment, END 121 may then transmit information identifying the sending host entity 160 to the receiving host entity 151. In an embodiment, the information identifying the sending host entity 160 may be a U-ID of the sending host entity 160. In an embodiment, the information identifying the sending host entity 160 may be metadata 316, a token that authenticates sending host entity 160, and/or other information about the sending host entity 160. For example, the information identifying the sending host entity 160 may comprise an indication that the sending host entity 160 is trustworthy. For example, the distributed mapping system 130 may store information that indicates whether a sending host entity 160 is trustworthy. The information that indicates whether a sending host entity 160 is trustworthy may include an authentication that the distributed mapping system 130 has performed with the sending host entity 160. The information that indicates whether a sending host entity 160 is trustworthy may include a subscription level that the sending host entity 160 has subscribed to with the distributed mapping system 130. The information that indicates whether a sending host entity 160 is trustworthy may include a setting that is pre-configured by a third party administrator and/or any other information that the receiving host entity 151 can use to determine whether to accept data traffic from a sending host entity 160. In some embodiments, the receiving host entity 151 may maintain local policies 460 that are used to determine which sending host entities 160 to accept traffic from. In an embodiment, the firewall 450 at the receiving host entity 151, or the END 121 acting on behalf of the receiving host entity 151, may use the local policies 460 to determine whether to accept data packets from the sending host entity 160.

At block 706, a data packet is received from an END associated with the sending host entity or directly from the sending host entity. For example, the Rx 220 of the receiving host entity 151 may receive the data packet 430 directly from the sending host entity 160, as shown in FIG. 4. Alternatively, the Rx 220 of the END 121 may receive data packet 530 from END 127, as shown in FIG. 5. In an embodiment, the source identifier field of the data packet may include an anonymized identifier of the sending host entity 160.

At block 709, the receiving host entity may determine whether the anonymized identifier in the source identifier field of the data packet matches the information identifying the sending host entity. For example, the processor 230 of the receiving host entity 151 may determine whether the anonymized identifier in the source identifier field 475 of the data packet 470 matches the information identifying the sending host entity 160. Alternatively, the processor 230 of the END 121 may determine whether the anonymized identifier in the source identifier field 575 of the data packet 570 matches the information identifying the sending host entity 160.

In an embodiment, the receiving host entity 151 may determine whether to accept the data packet 570 based on whether a local policy 460 indicates that data packets 570 including the anonymized identifier may be accepted by the receiving host entity 151. The Tx 225 of the END 121 may then transmit the data packet 570 to the receiving host entity 151 when one or more local policies 460 indicate that the anonymized identifier of the sending host entity 160 is a legitimate sender and the receiving host entity 151 is permitted to accept data packets 570 including the anonymized identifier as the source ID.

Figure 8:
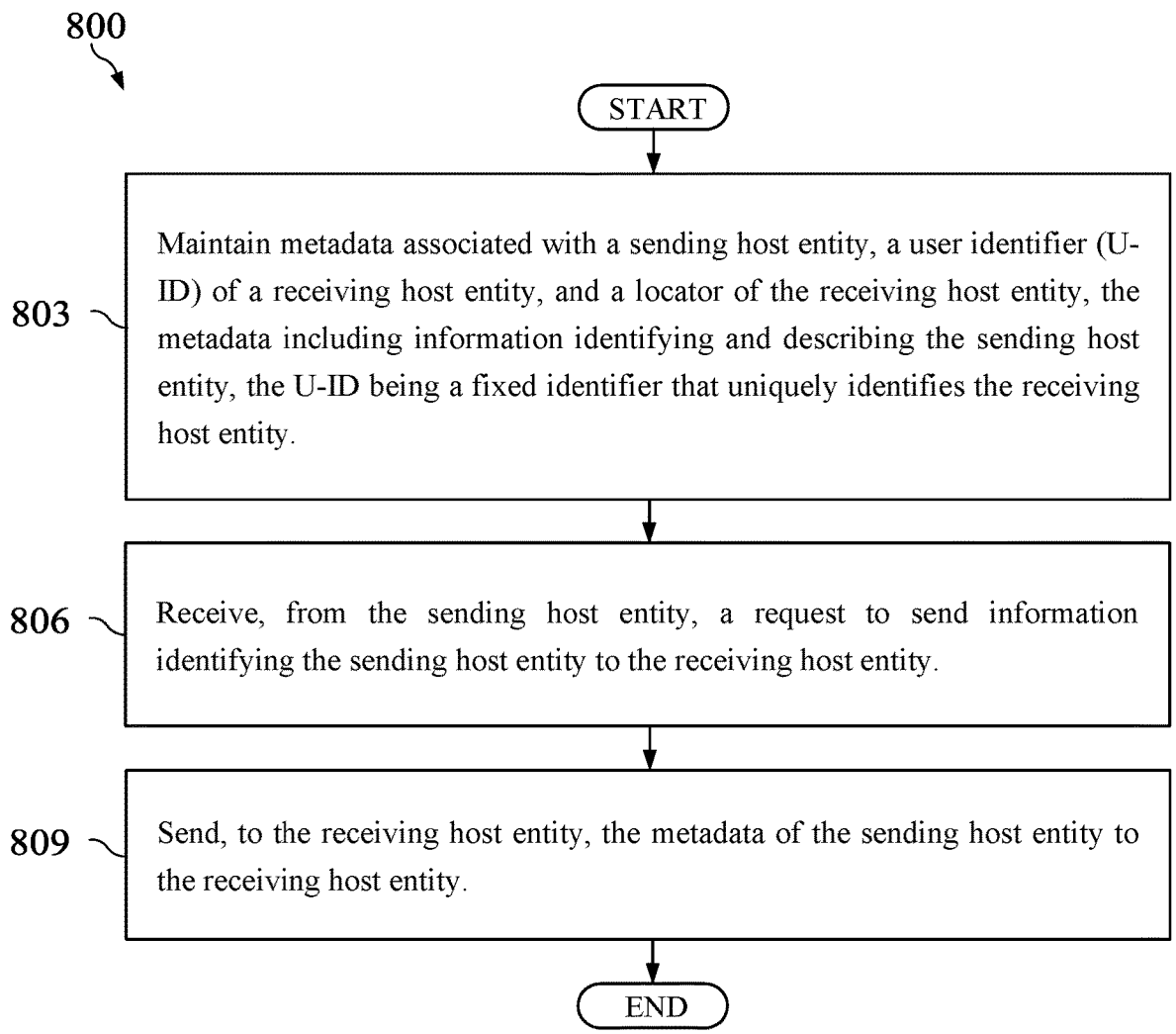
FIG. 8 is a method directed to receiver directed anonymization in an IEN according to an embodiment of the disclosure.

FIG. 8 is a method 800 directed to smart sender anonymization in an IEN. Method 800 may be implemented by an NE 200 in IEN 100. The NE 200 may be implemented as a distributed mapping system 130. For example, method 800 is implemented after the receiving host entity 151 and the sending host entity 160 have both completed subscription with the distributed mapping system 130. At block 803, metadata associated with a sending host entity, a U-ID of a receiving host entity, and a locator of the receiving host entity is maintained at a distributed mapping system.

For example, memory 240 of the distributed mapping system 160 maintains metadata 316 associated with a sending host entity 160, a U-ID of a receiving host entity 151, and a locator of the receiving host entity 151.

At block 806, a request to send information identifying the sending host entity 160 to the receiving host entity 151 is received from the sending host entity 160. For example, Rx 220 of the distributed mapping system 130 may receive the request directly from the sending host entity 160 or from the END 127 acting on behalf of the sending host entity 160. The request may be for the distributed mapping system 130 to send metadata 316 describing the sending host entity 160 to the receiving host entity 151. At block 809, the metadata of the sending host entity is sent to the receiving host entity. For example, Tx 225 of the distributed mapping system 130 may send metadata 316 to the receiving host entity 151. The embodiments disclosed herein permit the sender of data packets to remain anonymous with outside observers while maintaining the true identity of the sender with the receiver of the data packets.

In an embodiment, the disclosure includes a means for sending a data packet to a receiving host entity, a source identifier field of the data packet comprising an anonymized identifier of the sending host entity, the anonymized identifier being a temporary identifier of the sending host entity and a means for sending, a request for the distributed mapping system to send information identifying the sending host entity to the receiving host entity.

In an embodiment, the disclosure includes a means for receiving information identifying a sending host entity, a means for receiving a data packet from a sending END associated with the sending host entity, a source identifier field of the data packet comprising an anonymized identifier of the sending host entity, the anonymized identifier being a temporary identifier of the sending host entity, and a means for determining whether the anonymized identifier matches the information identifying the sending host entity.

In an embodiment, the disclosure includes a means for maintaining metadata associated with a sending host entity, a U-ID of a receiving host entity, and a locator of the receiving host entity, the metadata including information identifying and describing the sending host entity, the U-ID being a fixed identifier that uniquely identifies the receiving host entity, a means for receiving a request to send the metadata of the sending host entity to the receiving host entity, and a means for sending the metadata to the receiving host entity.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a sending host entity in a network, comprising:
   sending a data packet to a receiving host entity, a source identifier field of the data packet comprising an anonymized identifier of the sending host entity, the anonymized identifier being a temporary and recyclable identifier of the sending host entity such that different host entities in the network use the anonymized identifier during different time periods;
   sending an instruction to a distributed mapping system, the instruction instructing the distributed mapping system to send information identifying the sending host entity to the receiving host entity, the information identifying the sending host entity comprising at least one of a user identifier (U-ID) identifying the sending host entity or metadata describing the sending host entity; and
   receiving a response from the distributed mapping system indicating that the information identifying the sending host entity will be transmitted to the receiving host entity.

2. The method of claim 1, wherein the data packet is sent to the receiving host entity via a sending endpoint network device (END) and a receiving END, wherein the sending END and the receiving END are routers.

3. The method of claim 1, wherein the metadata indicates a type of device of the sending host entity.

4. The method of claim 1, wherein the metadata indicates a classification of the sending host entity, and wherein the classification indicates whether the sending host entity is trustworthy.

5. The method of claim 1, wherein the information identifying the sending host entity comprises a token, wherein the token is received from the receiving host entity prior to sending the data packet to the receiving host entity.

6. The method of claim 1, wherein the U-ID is a known identifier that uniquely identifies the sending host entity.

7. The method of claim 1, wherein the sending host entity uses the U-ID for communications with a second receiving host entity, wherein the U-ID is a known ID that uniquely identifies the receiving host entity.

8. A network element implemented as a sending host entity in a network, comprising:
 a memory storage comprising instructions; and
 one or more processors in communication with the memory storage, wherein the one or more processors execute the instructions to:
  send a data packet to a receiving host entity, a source identifier field of the data packet comprising an anonymized identifier of the sending host entity, the anonymized identifier being a temporary and recyclable identifier of the sending host entity such that different host entities in the network use the anonymized identifier during different time periods;
  send an instruction to a distributed mapping system, the instruction instructing the distributed mapping system to send information identifying the sending host entity to the receiving host entity, the information identifying the sending host entity comprising at least one of a user identifier (U-ID) identifying the sending host entity or metadata describing the sending host entity; and
  receive a response from the distributed mapping system indicating that the information identifying the sending host entity will be transmitted to the receiving host entity.

9. A method implemented by a receiving endpoint network device (END) acting on behalf of a receiving host entity in a network, comprising:
 receiving information identifying a sending host entity from a distributed mapping system, the information identifying the sending host entity comprising at least one of a user identifier (U-ID) identifying the sending host entity or metadata describing the sending host entity;
 receiving a data packet from a sending END associated with the sending host entity, a source identifier field of the data packet comprising an anonymized identifier of the sending host entity, the anonymized identifier being a temporary and recyclable identifier of the sending host entity such that different host entities in the network use the anonymized identifier during different time periods; and
 determining whether the anonymized identifier matches the information identifying the sending host entity.

10. The method of claim 9, further comprising transmitting the data packet to the receiving host entity when the anonymized identifier matches the information identifying the sending host entity.

11. The method of claim 9, wherein the metadata indicates a type of device of the sending host entity.

12. The method of claim 9, wherein the metadata indicates a classification of the sending host entity, and wherein the classification indicates whether the sending host entity is trustworthy.

13. The method of claim 9, wherein the information identifying the sending host entity comprises a token, wherein the token is sent to the sending host entity prior to sending the data packet to the receiving host entity.

14. The method of claim 9, wherein the information identifying the sending host entity comprises the U-ID of the sending host entity, and wherein the U-ID is a known identifier that uniquely identifies the sending host entity.

15. A network element implemented as a receiving endpoint network device (END) acting on behalf of a receiving host entity in a network, comprising:
 a memory storage comprising instructions; and
 one or more processors in communication with the memory storage, wherein the one or more processors execute the instructions to:
  receive information identifying a sending host entity from a distributed mapping system, the information identifying the sending host entity comprising at least one of a user identifier (U-ID) identifying the sending host entity or metadata describing the sending host entity;
  receive a data packet from a sending END associated with the sending host entity, a source identifier field of the data packet comprising an anonymized identifier of the sending host entity, the anonymized identifier being a temporary and recyclable identifier of the sending host entity such that different host entities in the network use the anonymized identifier during different time periods; and
  determine whether the anonymized identifier matches the information identifying the sending host entity.

16. A method implemented by a distributed mapping system in a network, comprising:
 maintaining metadata describing a sending host entity, a user identifier (U-ID) of the sending host entity, a U-ID of a receiving host entity, an anonymized identifier of the receiving host entity, and a locator of the receiving host entity, the metadata including information identifying and describing the sending host entity, the U-ID of the receiving host entity being a fixed identifier that uniquely identifies the receiving host entity, the U-ID of the sending host entity being a fixed identifier that uniquely identifies the sending host entity, the anonymized identifier of the receiving host entity being a temporary and recyclable identifier of the receiving host entity such that different host entities in the network use the anonymized identifier during different time periods;
 receiving, from the sending host entity, a request to send at least one of the metadata describing the sending host entity or the U-ID identifying the sending host entity to the receiving host entity; and
 sending the metadata describing the sending host entity or the U-ID identifying the sending host entity to the receiving host entity in response to receiving the request.

17. The method of claim 16, wherein the request is received from the sending host entity via a sending endpoint network device (END), wherein the sending END is a router.

18. The method of claim 16, wherein the metadata indicates a type of device of the sending host entity.

19. The method claim 16, further comprising storing the anonymized identifier in association with the receiving host entity.

20. The method of claim 16, wherein the metadata indicates a classification of the sending host entity, and wherein the classification indicates whether the sending host entity is trustworthy.

21. The method of claim 16, wherein the metadata comprises a token that the sending host entity received from the receiving host entity.

22. The method of claim 16, further comprising storing a plurality of locators including the locator of the receiving host entity is associated with the U-ID of the receiving host entity.

23. A network element implemented as a distributed mapping system in a network, comprising:
   a memory storage comprising instructions; and
   one or more processors in communication with the memory storage, wherein the one or more processors execute the instructions to:
      maintain metadata describing a sending host entity, a user identifier (U-ID) of the sending host entity, a U-ID of a receiving host entity, an anonymized identifier of the receiving host entity, and a locator of the receiving host entity, the metadata including information identifying and describing the sending host entity, the U-ID of the receiving host entity being a fixed identifier that uniquely identifies the receiving host entity, the U-ID of the sending host entity being a fixed identifier that uniquely identifies the sending host entity, the anonymized identifier of the receiving host entity being a temporary and recyclable identifier of the receiving host entity such that different host entities in the network use the anonymized identifier during different time periods;
      receive, from the sending host entity, a request to send at least one of the metadata describing the sending host entity or the U-ID identifying the sending host entity to the receiving host entity; and
      send at least one of the metadata describing the sending host entity or the U-ID identifying the sending host entity to the receiving host entity in response to receiving the request.

\* \* \* \* \*